United States Patent [19]
Kaiser et al.

[11] Patent Number: 5,767,404
[45] Date of Patent: Jun. 16, 1998

[54] ROTATION RATE SENSOR WITH A FLEXIBLE PRINTED CIRCUIT BOARD

[75] Inventors: Harry Kaiser, Markgroeningen; Rainer Willig, Tamm, both of Germany

[73] Assignee: Robert Bosch GmbH, Stuttgart, Germany

[21] Appl. No.: 663,208

[22] PCT Filed: Dec. 7, 1994

[86] PCT No.: PCT/DE94/01455

§ 371 Date: Jun. 3, 1996

§ 102(e) Date: Jun. 3, 1996

[87] PCT Pub. No.: WO95/16921

PCT Pub. Date: Jun. 22, 1995

[30] Foreign Application Priority Data

Dec. 17, 1993 [DE] Germany ............... 43 43 135.6

[51] Int. Cl.$^6$ .................................................. G01P 9/04
[52] U.S. Cl. ............................................ 73/504.13; 73/493
[58] Field of Search .................... 73/493, 497, 504.02, 73/504.12, 504.13, 514.01

[56] References Cited

U.S. PATENT DOCUMENTS

| | | | |
|---|---|---|---|
| 4,620,442 | 11/1986 | MacGugan et al. | 73/497 |
| 4,655,081 | 4/1987 | Burdess | 73/504.13 |
| 5,233,871 | 8/1993 | Schwarz et al. | 73/493 |
| 5,548,999 | 8/1996 | Kakizaki et al. | 73/493 |
| 5,581,032 | 12/1996 | Uemura et al. | 73/493 |

*Primary Examiner*—John E. Chapman
*Attorney, Agent, or Firm*—Michael J. Striker

[57] ABSTRACT

A measuring element (26) for detecting the movement of a vehicle to be monitored and an electrical circuit (35) for evaluating the measuring signals of the measuring sensor (26) are disposed in a housing (10) of a rotation rate sensor. The circuit (35) is connected with the measuring element (26) with the aid of a flexible printed circuit board (36). The printed circuit board (36) is bent 90 degrees in the area of the measuring element (26) in order to make possible a compact and space-saving construction in the housing (10, 11, 12). The printed circuit board (36) has a cutout (39) and two strips (40, 41) extending parallel with the cutout (39) in the bending area in order to make simple bending possible. It is furthermore possible in a simple way to insert a temperature sensor (45) into the one end (38) of the printed circuit board (36) in order to make possible a simple compensation of the deviation of the temperature.

10 Claims, 3 Drawing Sheets

ROTATION RATE SENSOR WITH A FLEXIBLE PRINTED CIRCUIT BOARD

BACKGROUND OF THE INVENTION

The invention relates to a rotation rate sensor in accordance with the species of the main claim. A measuring element for detecting the movement of a vehicle and an electrical circuit arranged on a printed circuit board are provided in a housing of rotation rate sensors in actual use up to now. The electrical components of the circuit are connected with the measuring element by means of wires. Due to the components used, the rotation rate sensor is relatively large and voluminous. Because of this it is difficult to install in motor vehicles, for example.

SUMMARY OF THE INVENTION

Accordingly, it is an object of the present invention to provide a rotation rate sensor which avoids the disadvantages of the prior art.

In keeping with these objects and with others which will become apparent hereinafter, one feature of the present invention resides, briefly stated in a rotation rate sensor, in which the measuring element is connected with the circuit by a flexible printed circuit board having a bending region, and a cutout is provided in the bending region.

When the rotation rate sensor is designed in accordance with the present invention, it has the advantage of allowing a very flat construction. The components are furthermore disposed in a very compact and space-saving manner in the housing of the rotation rate sensor. The electrical elements can be simply and compactly connected by means of the flexible printed circuit board, which is the connection between the hybrid circuit and the measuring element. Only a single element, the flexible printed circuit board, is required for this, in contrast to the several different wires up to now. The cutout in the flexible printed circuit board allows easy bending and thus elasticity without the printed circuit board being destroyed in the process. Furthermore, improved oscillation decoupling between the measuring element and the hybrid circuit is achieved by means of this. The oscillations to be detected by the measuring element are only transmitted to a very small degree to the hybrid circuit via the flexible printed circuit board. The very compact arrangement of a temperature sensor directly at the end of the flexible printed circuit board permits a simple and exact calibration possibility by means of deviations caused by temperature fluctuations. Thus the temperature fluctuations caused by the heat loss of the components of the hybrid circuit can be compensated in good time. The use of the flexible printed circuit board also simultaneously permits the shielding of the circuits arranged thereon by means of a shielding grate (ground shield). Because of the use of the flexible printed circuit board, it is also possible to arrange a ground strip between the respective signal-carrying strip conductors, so that the signal-carrying strip conductor are shielded from each other. The tongue formed at the plug permits the coded installation and can simultaneously be used for applying manufacturing data. The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
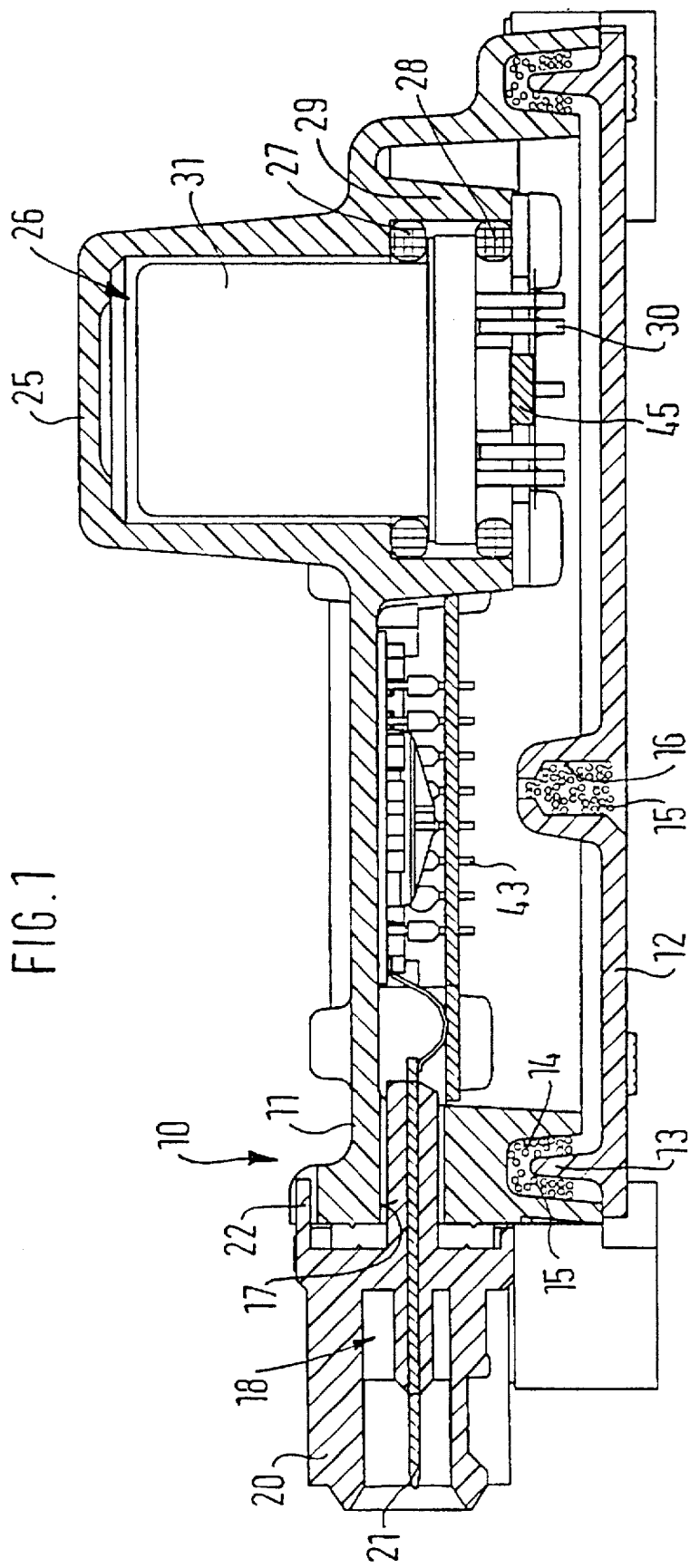
FIG. 1 shows a longitudinal section through a rotation rate sensor, FIG. 2 a view into the interior of the rotation rate sensor with the cover open, and FIG. 3 a perspective view of the assembled rotation rate sensor.

The housing of a rotation rate sensor, consisting of an upper element 11 and a cover 12, is indicated by 10 in FIG. 1. The cover 12 has a circumferential edge 13, which is inserted into a circumferential groove 14 in the upper element 11 and is fastened therein by casting with the aid of a casting compound 15. During assembly, air can escape from the housing 10 with the aid of an opening 16 formed in the cover 12. This opening 16 can subsequently be closed with the casting compound 15.

Figure 3:
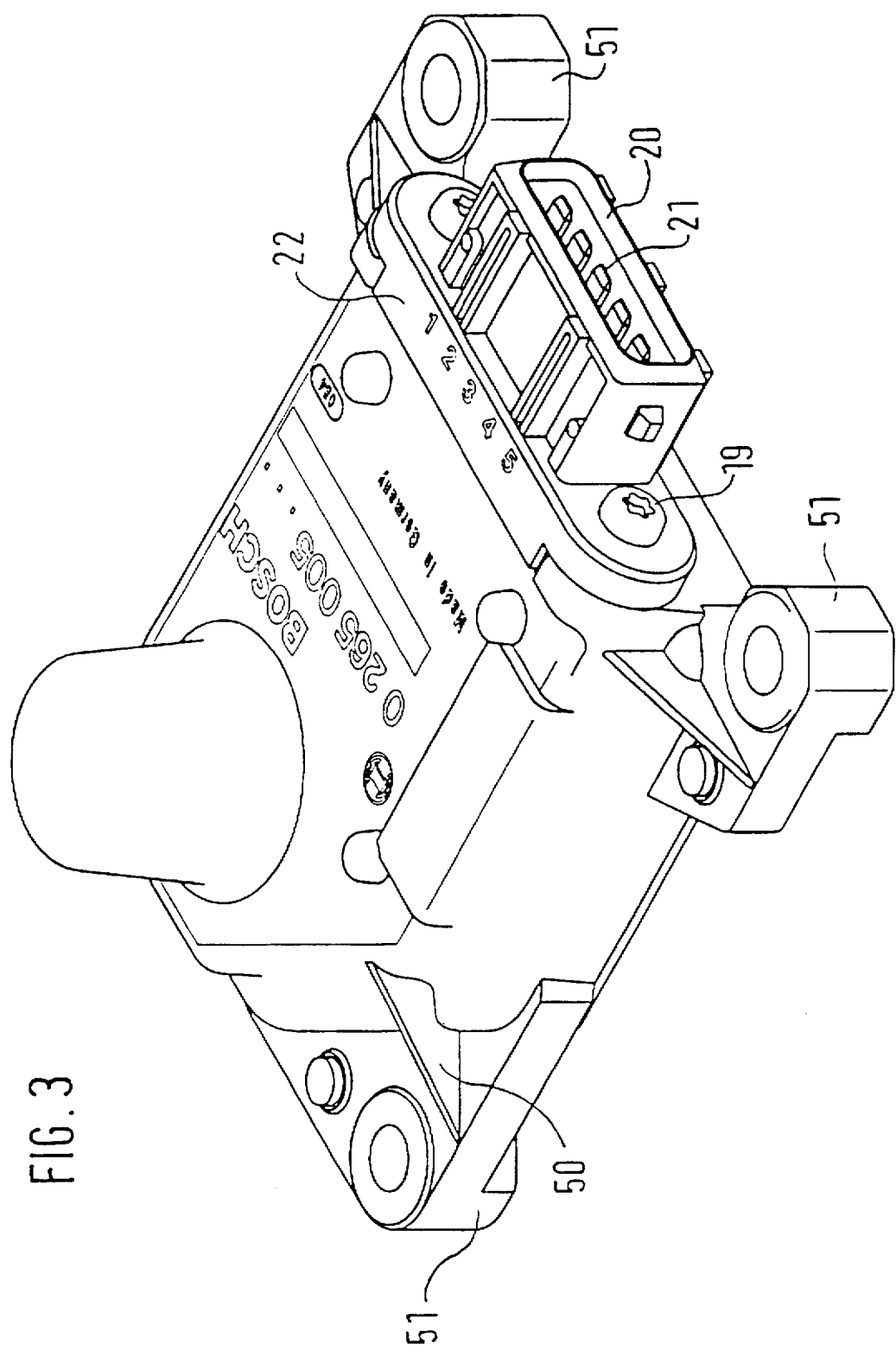

The upper element 11 has a lateral opening 17, into which a contact strip 18 has been sealingly inserted, and is fastened by means of screws 19. This contact strip 18 has a collar-shaped receiving well 20, into which several contact elements 21 have been inserted. A flange-like extension 22 is formed on the top of the receiving well 20 and projects past the upper element 11. Coding of the contact strip 18 is possible with the aid of this extension 22 in order to prevent the wrong insertion of the contact strip 18 into the opening 17. It is furthermore possible to print technical data, such as the manufacturing date, etc., on the extension 22, as shown in FIG. 3.

The upper element 11 of the housing 10 furthermore has a cup-shaped bulge 25, in which a measuring element 26 is disposed. The measuring element 26 is seated with the aid of two O-rings 27, 28 in an edge 29 projecting into the interior of the upper element: 11. Measuring elements 26 operating in accordance with various principles can be inserted into the bulge 25, and are not shown in detail in the drawings. A measuring element operating by means of piezo elements will be explained by way of example in what follows. This measuring element consists of a metal bowl made of high-alloy tool steel, which projects into the bulge 25 and is surrounded by O-rings 27, 28 in the area of the bottom. Eight small surfaces are bezeled to the upper end of the bowl 90, i.e. in the area of the opening, so that eight small systems capable of oscillations are created. Respectively one piezo element 80 is soldered on these surfaces. The bottom of the bowl is welded to a glass duct. The piezo elements are electrically connected with the aid of a soldered-on wire with pins 30, shown in the drawings, of the glass duct. A cup 31, placed over the metal bowl, is welded under vacuum to the glass duct. The bowl is excited to oscillate by four piezo elements, which are respectively offset by 90 degrees from each other, by means of a voltage applied to the piezo elements. Because of this the bowl continues to oscillate with a resonance frequency. Oscillation nodes are now created at 45 degrees in respect to the exciting piezo elements. If a rotary movement, caused by a skidding vehicle for example, is now superimposed on the oscillating bowl, the oscillation nodes are displaced by the Coriolis force. The remaining four piezo elements used as sensor elements are disposed at 45 degrees in respect to the four exciting piezo elements. With the oscillation nodes displaced, these four piezo elements sense a measuring signal. The four exciting piezo elements in an electrical circuit are triggered with the aid of this signal in such a way that the oscillation nodes come to rest again over the sensor piezo elements. This restoring element for the oscillation corresponds to the rotation rate caused by the above mentioned skidding vehicle (compensation principle).

An electrical circuit, for example a hybrid circuit, for evaluating the measuring signal generated by the measuring element 26 is disposed next to the measuring element 26, i.e. outside of the frame 29, at the bottom of the upper element 11. The electrical components of the circuit 35 are electrically connected with the contact elements 21 with the aid of a bonded connection.

The measuring element 26 and the circuit 35 are connected with the aid of a flexible printed circuit board. For this purpose the printed circuit board 36 has a section 37 extending approximately parallel with the circuit 35 and the measuring element 26. The printed circuit board 36 is bent at an angle of approximately 90 degrees in the area of the measuring element 26, and this area 38 is therefore extended to the measuring element 26 almost perpendicularly in respect to the area 37. A cutout 39 is located in the area of the bend in order to make a simple bending of the printed circuit board 36 possible. Because of the cutout 39, the printed circuit board 36 has two strips 40, 41 in the area of the bend. The area 38 of the printed circuit board 36 has several bores which correspond with pins 30 protruding from the measuring element 26. Because of this the printed circuit board 26 is placed in a simple manner on the pins 30 of the measuring element 26. As can also be seen from FIG. 2, the arrangement of the pins 30 is not uniform, so that a coding is created. Because of this the area 38 of the printed circuit board 36 is always correctly placed on the pins 30 of the measuring element and is thus electrically contacted with it.

A temperature sensor 45 is disposed between the measuring element 26 and the flexible printed circuit board 36 for an improved temperature compensation. This temperature sensor 45 is seated in a bore 46 formed in the area 38 of the printed circuit board 36. This temperature sensor 45 is required for calibrating the measurement curve of the circuit 35 because of deviations of the measured values on account of temperature fluctuations. It is known that the electrical components of the circuit generate waste heat, so that the temperature in the housing 10 can fluctuate during employment or operation of the rotation rate sensor. These fluctuations are optimally detected in the area of the measuring element 26 with the aid of the temperature sensor 45 and are coevaluated in the circuit 35.

Figure 2:
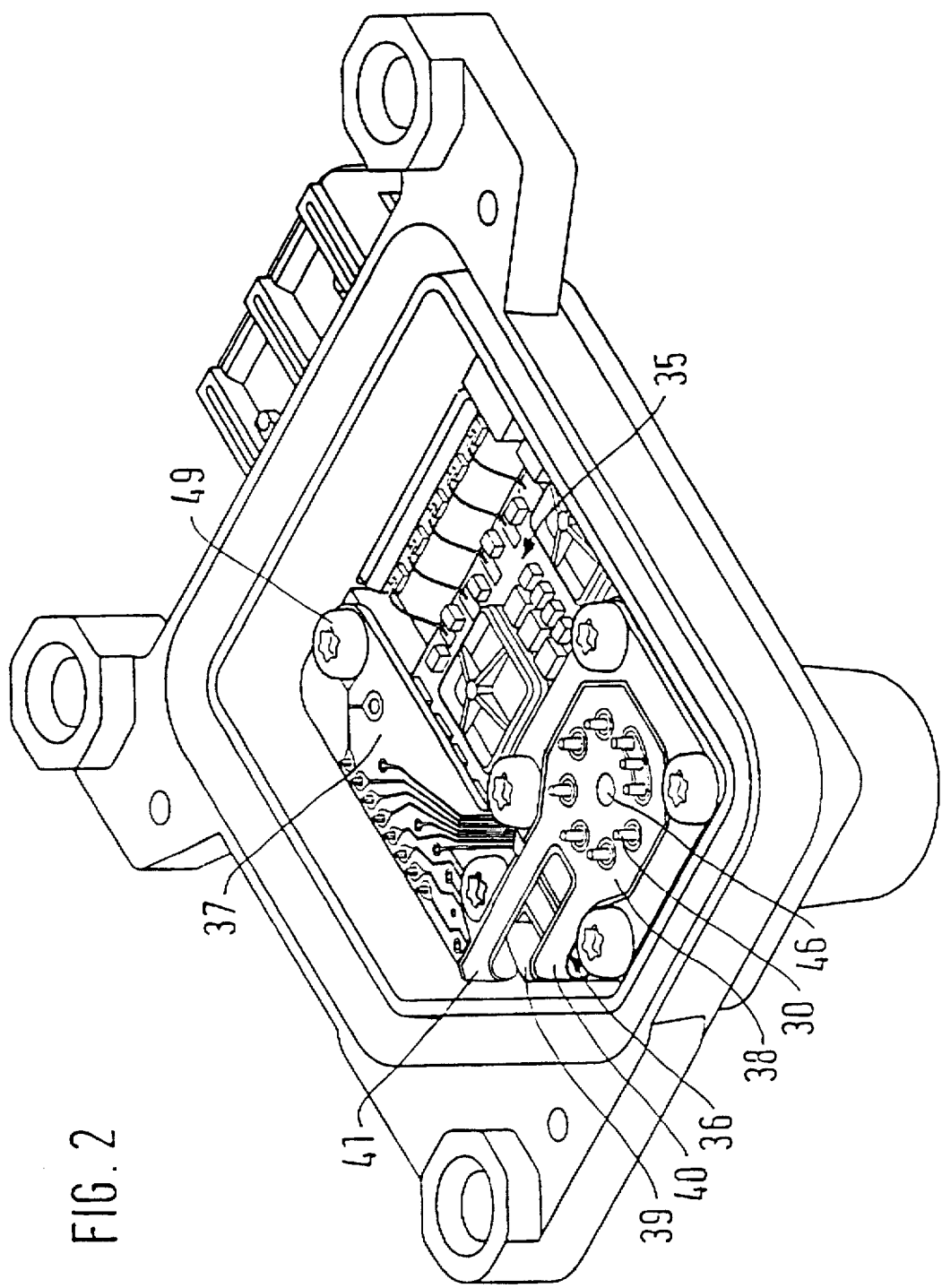

Not only does the flexible printed circuit board 36 permit a compact construction of the rotation rate sensor, but it is also possible, for example as shown in FIG. 2, to interrupt the signal lines by respectively one ground line. The printed circuit board 36 itself is fixed at the bottom of the upper element 11 by means of screws 49, as can be seen in FIG. 2. A shielding grate, used as a ground shield, is applied on the side of the printed circuit board 36 facing away from the signal lines.

As can be seen from FIG. 3, the housing 10 of the rotating rate sensor has three fastening eyes 51 provided with ribs 50 in order to be able to fasten the housing in a statically defined manner on the vehicle with the aid of screws.

What is claimed is:

1. A rotation rate sensor, comprising a housing; a measuring element for detecting a movement of a vehicle and located in said housing; an electrical circuit for evaluating measuring signals of said measuring element; a contact located in said housing for electrically connecting said circuit with components; and a flexible printed circuit board connecting said measuring element with said circuit and having a bending region which is provided with a cutout.

2. A rotation rate sensor as defined in claim 1, wherein said printed circuit board has two strips extending parallel to one another.

3. A rotation rate sensor as defined in claim 1, and further comprising a temperature sensor disposed on said flexible printed circuit board in an area of said measuring element.

4. A rotation rate sensor as defined in claim 1, and further comprising signal-carrying strip conductors, and at least one grounding strip located between said signal-carrying strip conductors.

5. A rotation rate sensor as defined in claim 1, wherein said circuit is formed as a hybrid circuit.

6. A rotation rate sensor as defined in claim 1, wherein said measuring element has a bowl having an upper edge; and further comprising a plurality of piezo elements provided for generation of oscillations and for detection of a measuring signal and arranged on said upper edge of said bowl.

7. A rotation rate sensor as defined in claim 1, wherein said contact has a side and is provided on said side with a flange-like extension.

8. A rotation rate sensor as defined in claim 1, wherein said printed circuit board is bent at an angle in an area of said measuring element.

9. A rotation rate sensor as defined in claim 1, and further comprising two components arranged one behind the other in two planes, said flexible printed circuit board connecting said two components with one another.

10. A rotation rate sensor, comprising a housing; a measuring element for detecting a movement of a vehicle and located in said housing; an electrical circuit for evaluating measuring signals of said measuring element; a contact located in said housing for electrically connecting said circuit with components; and a flexible printed circuit board connecting said measuring element with said circuit and having a bending region which is provided with a cutout, so that components which do not directly coincide with one another and located one after the other but instead are offset or turned can also be connected with one another.

* * * * *